Nov. 2, 1965     V. BÁŠTECKÝ ETAL     3,215,275
HEATED FILTRATION PRESSURE DEVICE FOR OBTAINING
SOLID MATERIALS FROM SOLUTIONS
Filed Nov. 28, 1962
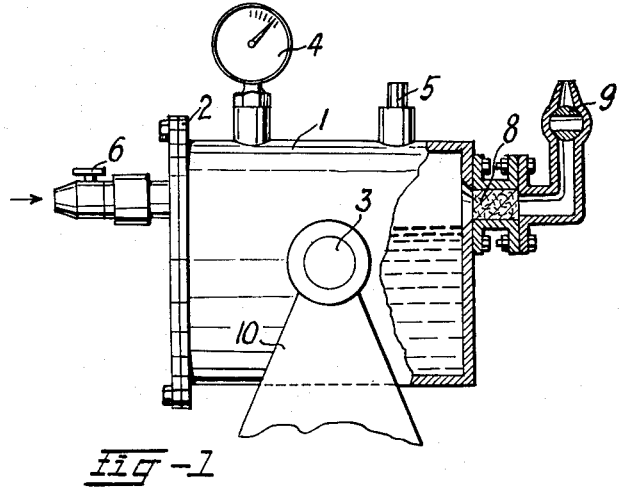
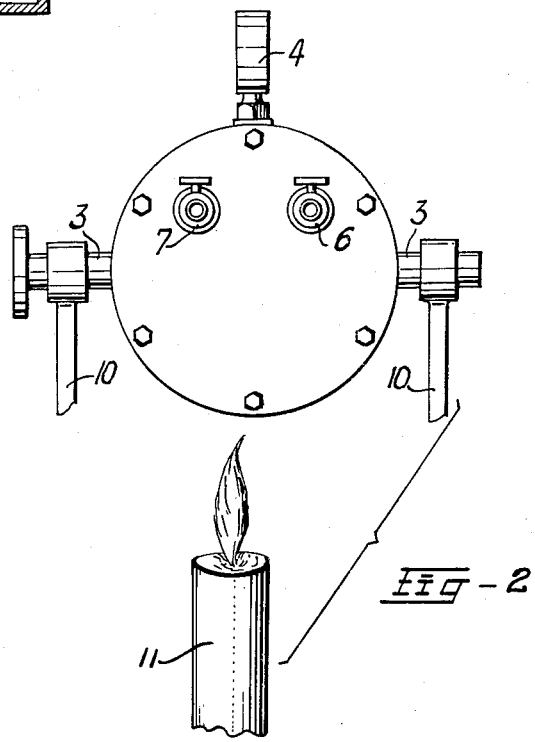
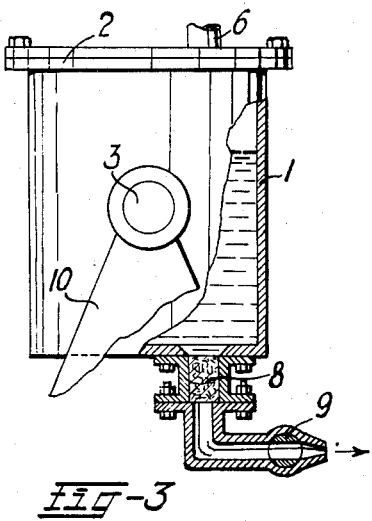
INVENTORS.
VLADIMIR BÁŠTECKÝ
KAREL KLOC
JAROSLAV PETLICKA
OTA HAJICEK
VERA KREJCOVA
RUDOLF STRUBL
BY
Attorney 3,215,275
HEATED FILTRATION PRESSURE DEVICE FOR OBTAINING SOLID MATERIALS FROM SOLUTIONS
Vladimír Báštecký, Prague, Karel Kloc, Prague-Chodov, and Jaroslav Petlička, Ota Hájíček, Věra Krejčová, and Rudolf Strubl, Prague, Czechoslovakia, assignors to Československá Akademie věd, Prague, Czechoslovakia, a corporation of Czechoslovakia
Filed Nov. 28, 1962, Ser. No. 240,535
Claims priority, application Czechoslovakia, Nov. 29, 1961, 7,053/61
1 Claim. (Cl. 210—179)

The invention relates to a heated filtration pressure device for obtaining solid materials from solutions.

The object of the invention is a pressure filtration device. So far, there is no such device which allows filtration of solid materials separated from liquid solutions under heat and pressure directly in the device itself, without leading again to dissolution of the obtained solid materials at the necessary working temperature.

Such filtrations have to be carried out in the case of all materials which have crystallized from solutions, particularly if materials with a negative temperature coefficient of solubility are involved. The lack of a suitable device has yet prevented to exploit industrially the negative temperature coefficient of solubility, although it would be of industrial interest to make use of its large possibilities, for example in treating waste pickling baths liquors, extracts of concentrates, or slimes, and the like.

An advantage of the heated filtration pressure device in accordance with the invention for obtaining solid materials from solutions resides in the fact that it makes possible the above mentioned filtration in a quick and simple manner and that it yields solid materials from solutions without the need of evaporating the same. As a result thermal energy is saved and maintenance of the production equipment is easier and this equipment does not occupy too much production space. The device may be also adapted for full automation.

In accordance with the invention, the heated filtration pressure device for obtaining solid materials from solutions consists of a rotary pressure tank with the respective instruments for measuring and regulating the pressure and temperature, and with the relevant valves, and of a movable filtration insertion element. This element may be mounted inside or outside the pressure tank, rigidly or removably, in such a manner that it comes into contact with the treated liquid only during the filtration process.

The invention will be best understood from the following specification to be read in conjunction with the accompanying drawings showing a preferred example of embodiment. In the drawings:

FIG. 1 is a side elevation showing the device in the filling position;

FIG. 2 is the same device in front elevation; and

FIG. 3 shows the mentioned device in side elevation in the filtration position.

The notation of the various elements in the figures is the following: 1 denotes the pressure tank proper; 2 is its cover; 3 denotes a bolt about which the pressure tank can be rotated; the treated liquid is supplied into the tank through the admission device 6; 9 is an outlet valve; 8 denotes a removable filtration insert or element; 5 is a device for measuring and regulating the temperature; 4 is a control manometer; 7 is a pressure admission valve; and 10 denotes the standard of the device. Conventional heating means 11 for the tank are schematically indicated in FIG. 2. Such heating means of any known type may have any desired location relative to the tank and they do not form part of the invention.

The device in accordance with the invention will now be described and its operation explained so that those expert in the art may perform the invention more readily.

Referring more particularly to FIG. 1: In the position shown, the pressure tank 1 is filled with the treated solution below the level of the filtration element 8. The solution is now heated to the required temperature so that the relevant pressure is obtained. Valve 7, shown in FIG. 2, allows to increase the pressure at any time, in accordance with requirements. The valve 7 may also be used for supplying various gases for mixing or passing the liquid through the gas in bubbles and pearls or for producing chemical reactions.

After the mixture has been kept at the optimum temperature and pressure for the time necessary to obtain the required degree of precipitation of the solid material, or for fixation of the chemical reactions, the device is rotated about the pin 3 through 90°, see FIG. 2, the valve 9, shown in FIGS. 1 and 3, is opened and the mixture is filtered making use of the pressure in the tank 1. Filtration takes place through the filter element 8.

If required, the described and illustrated filtration device in accordance with the invention may also be designed so that the filtration element is rigidly or removably mounted outside or inside the pressure tank. But its position must always be so that it comes into contact with the treated liquid only during the filtration process.

The device in accordance with the invention is not limited only to obtaining solid materials from solutions, but it may also be used for carrying out chemical reactions between the treated materials and further materials of any state, if necessary also with filtration. The scope of application of the invention can thus be considerably increased.

We claim:

A pressure tank for the filtration of liquid media particularly of suspensions and solutions having a negative solubility coefficient, comprising in combination a tank having a substantially cylindrical side wall and substantially parallel end walls; first inlet means for the liquid medium to be filtered on one of said end walls; second inlet means for a pressure medium; heating means for the liquid medium; outlet means for the liquid medium in the upper portion of the other end wall; filter means removably mounted on said other end wall in association with said outlet means; and supporting means for the tank to tilt the same from a substantially horizontal receiving and heating position with the end walls disposed vertically into a substantially upstanding discharging and filtering position with the end walls disposed horizontally, whereby said other end wall in its horizontal position forms the bottom of the tank permitting the liquid medium to discharge through the filtering means.

References Cited by the Examiner

UNITED STATES PATENTS

| | | | |
|---|---|---|---|
| 146,586 | 1/74 | Firman | 210—85 X |
| 273,778 | 3/83 | Strong | 210—56 |
| 707,566 | 8/02 | Edson | 210—69 X |
| 1,275,463 | 8/18 | Nicoll | 210—462 X |
| 1,553,067 | 9/25 | Burnette | 210—56 |
| 1,751,671 | 3/30 | Webb | 210—267 X |

REUBEN FRIEDMAN, *Primary Examiner.*

HARRY B. THORNTON, *Examiner.*